United States Patent [19]
Bruhnke et al.

[11] Patent Number: 5,516,188
[45] Date of Patent: May 14, 1996

[54] INFLATABLE CHILD SEAT

[75] Inventors: Ulrich Bruhnke, Ehningen; Klaus P. Claar, Gechingen; Dieter Feichtiger, Aidlingen; Horst Kohl, Ehningen; Wolfram Schroeder, Ebersberg; Martin Lindmayer, Leonberg, all of Germany

[73] Assignee: Mercedes-Benz AG, Stuttgart, Germany

[21] Appl. No.: 314,654

[22] Filed: Sep. 29, 1994

[30] Foreign Application Priority Data

Sep. 29, 1993 [DE] Germany .............. 43 33 131.9

[51] Int. Cl.$^6$ ................................. H47C 13/00
[52] U.S. Cl. .............. 297/129; 297/452.41; 297/DIG. 3; 297/250.1; 297/252; 297/118
[58] Field of Search ............ 297/452.41, DIG. 3, 297/250.1, 118, 183.5, 17, 252; 5/654, 655, 449, 455

[56] References Cited

U.S. PATENT DOCUMENTS

| | | |
|---|---|---|
| 2,429,795 | 10/1947 | Blanchard et al. .............. 297/118 |
| 3,112,956 | 12/1963 | Schick et al. ............. 297/452.41 X |
| 3,419,309 | 12/1968 | Smith ...................... 297/452.41 |
| 4,715,652 | 12/1987 | Ward ............................ 297/252 |
| 4,781,413 | 11/1988 | Shumack, Jr. ................ 297/252 |
| 4,836,605 | 6/1989 | Greenwood et al. ........ 297/250.1 |
| 4,840,425 | 6/1989 | Noble ................... 297/DIG. 3 X |
| 4,843,662 | 7/1989 | Handelman ............. 297/232 X |
| 4,863,003 | 9/1989 | Carter ....................... 297/118 X |
| 5,292,175 | 3/1994 | Artz ...................... 297/452.41 X |
| 5,292,176 | 3/1994 | Artz ...................... 297/452.41 X |
| 5,335,968 | 8/1994 | Sheridan et al. ...... 297/DIG. 3 X |

Primary Examiner—Peter M. Cuomo
Assistant Examiner—Rodney B. White
Attorney, Agent, or Firm—Evenson, McKeown, Edwards & Lenahan

[57] ABSTRACT

An inflatable child seat includes at least two air chambers. The child seat is foldable when the at least two air chambers have been evacuated to form a suitcase like body. A releasable fastener is provided for fixing the child seat in its folded position. One half of the suitcase-like body forms an air chamber representing an inflatable cushion and the other half contains air chambers forming side parts, a backrest, a head restraint and a tray of the child seat.

14 Claims, 1 Drawing Sheet

INFLATABLE CHILD SEAT

The invention relates to an inflatable child seat, in particular for use in motor vehicles, having at least two air chambers.

European Patent document EP O 350 236 B1 discloses an inflatable child seat having a non-inflatable base, an inflatable side and rear wall and, additionally, inflatable lateral support pads for increasing the stability of the side and rear walls. For transportation, this known child seat must be stowed in its evacuated condition in a bag or other storage container.

There is therefore needed a child seat of the above-mentioned type which can be stowed in a simple manner which is suitable for its operation.

These needs are met according to the present invention by virtue of the fact that the child seat is folded up in its deflated condition in the shape of a bag, and is fixed in this folded position through the use of a releasable fastener. As a result, an additional storage container for storing the child seat is not required. By folding up the child seat in the shape of a bag, the seat can be transported in a simple manner. The folded-up bag itself can even be used as a seat support for older children, in particular if it is designed such that it is flat and cushion-like.

In an advantageous embodiment of the invention, one air chamber forms one half of the bag and is designed as a cushion. In a further embodiment of the invention, further air chambers are designed as side parts, such as the backrest, the head restraint and the tray. As a result, the bag can be placed in a simple manner onto a vehicle seat. The cushion is automatically in the correct position after the air chamber has been inflated. This measure is advantageous if—in particular for older children—the inflated seat cushion has a height sufficient to raise the sitting position of the child for a corresponding seat-belt arrangement. The child seat can therefore be used for children of different age-groups, i.e., from very small children up to children of 10 to 12 years of age.

In a further advantageous embodiment of the invention, the air chambers are provided with pneumatic connections for an electrically operable pump device. The pump device has either a pressure generator or a positive-pressure or negative-pressure generator. The pump device is positioned in the motor vehicle.

In a still further embodiment of the invention, the pump device, in particular a pressure pump or dual pressure pump, including a control device, can be integrated into the bag. As a result, the child seat merely has to be connected to the vehicle's own electric supply in order for it to be able to be inflated or evacuated. In the same manner, this child seat can also be used in living-areas by connecting the seat to the electric power supply.

In a still yet further embodiment of the invention, a pressure store, which is connected to the air chambers and can be triggered by a control element, is provided. As a result, rather than having to be connected to an external pressure pump, the child seat can instead be inflated from the folded-up bag shape by a simple triggering of the control element. External power supply sources are therefore not necessary.

In another embodiment of the invention, a fabric cover is provided. The fabric cover covers at least the backrest and the seat cushion in the inflated condition. In the deflated condition, the fabric cover forms an outer skin of the bag. This is a measure which is practical and in particular is visually appealing.

In still another embodiment of the invention, a carrying handle for the bag is provided. As a result, transportation of the child seat in the folded-up condition is further simplified.

Other objects, advantages and novel features of the present invention will become apparent from the following detailed description of the invention when considered in conjunction with the accompanying drawings.

DETAILED DESCRIPTION OF THE DRAWINGS

Figure 1:
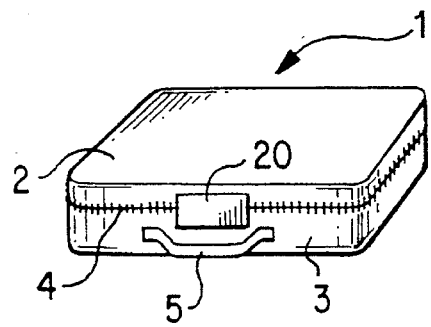
FIG. 1 is a perspective representation of one embodiment of a child seat according to the present invention, the child seat being shown in the deflated and folded-up condition, in which it is designed in the shape of a bag and is fixed in this condition via a zip fastener.

An inflatable child seat 1 according to FIGS. 1 to 5 has in its inflated condition (FIG. 5) a cushion 2, a seat cushion 14, a backrest 9, two side parts 8 and a head restraint 10. An air chamber is provided for each of the parts. The child seat 1 is moreover connected to a dual-pressure pump 7 via a control device 6. The control device 6 represents a switching valve to which feed lines to each air chamber are connected. This control device 6 makes it possible to inflate or to evacuate individual air chambers separately or all together. The air chambers of the individual parts of the child seat 1 are formed by plastic air cushions which are connected to one another in such a manner that as they are being evacuated they fold up into defined positions and shapes.

In the completely evacuated condition (FIGS. 1 and 2), the child seat 1 is folded up in the shape of a suitcase-like bag. The somewhat narrower half of the bag is formed by an air chamber representing a cushion 2. The child seat 1 which has been folded up to form a bag is fixed in this folded-up condition by a surrounding zip fastener 4 or a touch and close (hook and loop) fastener 20 providing a clinging fastening such as a Velcro®-type fastener (shown in dotted lines), between the cushion 2 and the other seat half 3. In addition, there is attached to the front side a carrying handle. The bag can be transported and stowed in a simple manner using the carrying handle 5. In the folded-up condition, the child seat 1 is approximately the size of an attache case.

Figure 2:
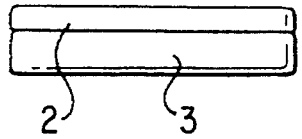
FIG. 2 is a front view of the child seat in the deflated condition according to FIG. 1, the carrying handle according to FIG. 1 not being shown for clarity reasons.
Figure 3:
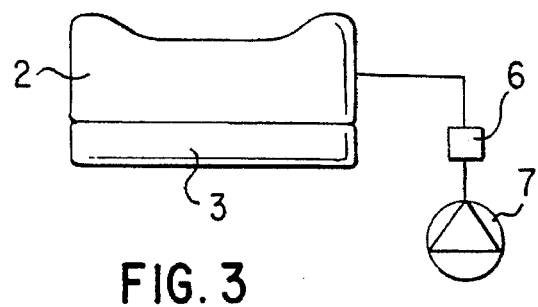
FIG. 3 is a front view representation of the child seat according to FIG. 2, in which one half of the bag is inflated to form a seat cushion.
Figure 4:
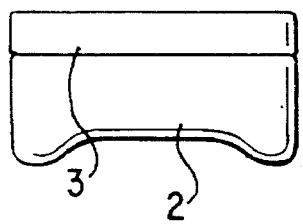
FIG. 4 illustrates the condition of the child seat according to FIG. 3, wherein the child seat is rotated by 180°.
Figure 5:
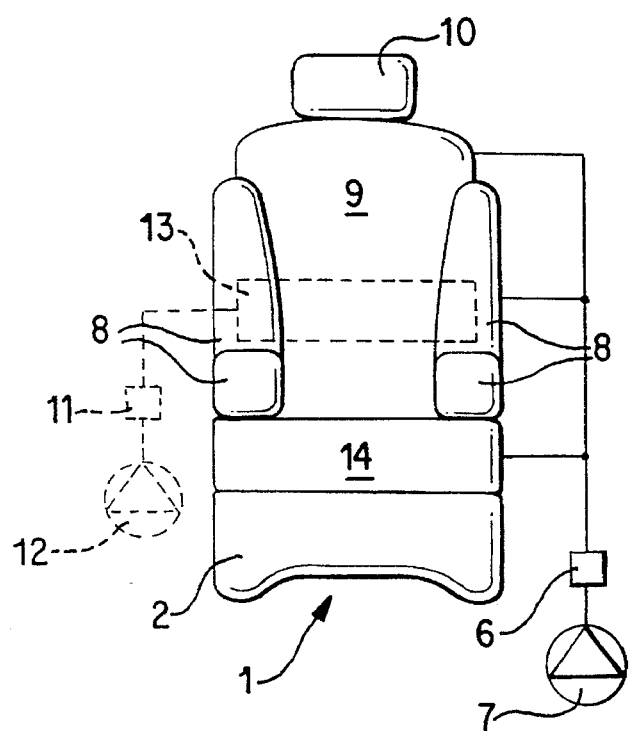
FIG. 5 illustrates a completely inflated child seat according to FIGS. 1 to 4 from the position shown according to FIG. 4.

If the child seat 1 having a downwardly directed seat half 3, corresponding to FIG. 2, is positioned on a motor-vehicle seat of a passenger car, a child can sit on the cushion 2 of the bag. This results in the child obtaining a raised sitting position. For older children this sitting position is already sufficient to allow the seat-belt to be satisfactorily put on. To further raise the sitting position, the cushion 2 according to FIG. 3 can, moreover, be inflated by the control device 6 and the dual-pressure pump 7, the cushion 2 having certain lateral restraints at the sides. If the intention is to inflate the child seat 1 further for small or very small children, it is turned over in a simple manner by 180°. In this position, the cushion 2 rests on the vehicle seat. The other seat half 3 contains the seat cushion 14, the side parts 8, the backrest 9 and the head restraint 10 in the folded-up condition. The inflation of these parts brings about the shape of the child seat 1 shown according to FIG. 5.

Represented only by broken lines is a tray 13 which can be releasably connected to the side parts 8 and likewise represents an air cushion. This tray 13 is provided with a separate control device 11 and a separate pressure pump 12. The tray 13 may be put on if and when the need arises, for example, for very small children. In an embodiment of the invention which is not represented, the tray is also integrated into the child seat and fixedly connected to the side parts.

In the exemplary embodiment shown, the control device 6 and the dual-pressure pump 7 are connected to the child seat 1. When the seat has been folded up, the control device 6 and dual-pressure pump 7 can be integrated into the bag. The control device 6 and dual-pressure pump 7 are electrically operable. The child seat 1 can therefore be inflated or evacuated as soon as the control device 6 and the dual-pressure pump 7 are connected to the vehicle's own power supply.

In an embodiment of the invention which is not represented, the control device and the dual-pressure pump are arranged in a fixed manner in the motor vehicle. In this embodiment, the inflatable child seat is provided with pneumatic connections which are connected to the fixed feed lines of the dual-pressure pump.

In a further embodiment of the invention which is not represented, instead of a pump device, the child seat is provided with a pressure store which has a control valve which can be opened or closed using a simple control element. As a result, rather than requiring an external power supply, the child seat can be readily inflated if and when the need arises by opening the valve.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An inflatable child seat for use in a motor vehicle, comprising:
   at least two air chambers having integral exterior surfaces;
   wherein said child seat is foldable when said at least two air chambers are deflated and the deflated air chambers form a suitcase like body, an exterior of said suitcase like body formed by said integral exterior surfaces of said at least two air chambers;
   a releasable fastener for fixing said child seat in its folded position; and
   wherein one half of said suitcase-like body forms an air chamber representing an inflatable cushion and the other half contains air chambers automatically forming side parts, a backrest, a head restraint and a tray of said child seat in its inflated condition.

2. A child seat according to claim 1, wherein the air chambers are provided with pneumatic connections for an electrically operable pump device.

3. A child seat according to claim 2, further comprising a fabric cover which covers at least the backrest and the seat cushion in the inflated condition and in the deflated condition forms an outer skin of the suitcase-like body.

4. A child seat according to claim 2, wherein a pump device including a control device is integrated into the suitcase-like body.

5. A child seat according to claim 4, further comprising a fabric cover which covers at least the backrest and the seat cushion in the inflated condition and in the deflated condition forms an outer skin of the suitcase-like body.

6. A child seat according to claim 4, wherein said pump device is a pressure pump.

7. A child seat according to claim 4, wherein said pump device is a dual pressure pump.

8. A child seat according to claim 1, further comprising a pressure store, said pressure store being connected to the air chambers and being triggered by a control element.

9. A child seat according to claim 8, further comprising a fabric cover which covers at least the backrest and the seat cushion in the inflated condition and in the deflated condition forms an outer skin of the suitcase-like body.

10. A child seat according to claim 1, further comprising a fabric cover which covers at least the backrest and the seat cushion in the inflated condition and in the deflated condition forms an outer skin of the suitcase-like body.

11. A child seat according to claim 1, wherein one of a surrounding zip fastener and a touch-and-close fastener is provided as said releasable fastener.

12. A child seat according to claim 11, further comprising a carrying handle provided for the suitcase-like body.

13. A child seat according to claim 1, wherein said child seat is used in a motor vehicle.

14. An inflatable child seat for use in a motor vehicle, comprising:
   at least two air chambers having integral exterior surfaces;
   wherein said child seat is foldable when said at least two air chambers are deflated and the deflated air chambers to form a suitcase like body, an exterior of said suitcase like body formed by said integral exterior surfaces of said at least two air chambers;
   a releasable fastener for fixing said child seat in its folded position;
   wherein one half of said suitcase-like body forms an air chamber representing an inflatable cushion and the other half contains air chambers automatically forming side parts, a backrest, a head restraint and a tray of said child seat in its inflated condition; and
   means for inflating said at least two air chambers, said inflating means inflating said at least two air chambers either individually or together.

* * * * *